United States Patent [19]

Jhaveri et al.

[11] Patent Number: 4,789,693

[45] Date of Patent: Dec. 6, 1988

[54] HEAT CURABLE FOUNDRY MIXES AND BINDER COMPOSITIONS

[75] Inventors: Satish S. Jhaveri, Oakville, Canada; William R. Dunnavant; Heimo J. Langer, both of Columbus, Ohio

[73] Assignee: Ashland Oil, Inc., Russell, Ky.

[21] Appl. No.: 90,803

[22] Filed: Aug. 28, 1987

[51] Int. Cl.$^4$ .............................................. C08K 3/36
[52] U.S. Cl. .................................. 523/145; 523/146; 164/15; 524/414; 524/418
[58] Field of Search .................. 523/145, 146; 164/15, 164/527

[56] References Cited

U.S. PATENT DOCUMENTS

| | | | |
|---|---|---|---|
| 3,306,864 | 2/1967 | Lang | 260/172 |
| 4,426,467 | 1/1984 | Quist et al. | 523/145 |
| 4,468,359 | 8/1984 | Lemon et al. | 264/82 |
| 4,468,486 | 8/1984 | Matsushima et al. | 523/145 |
| 4,474,904 | 10/1984 | Lemon et al. | 523/146 |
| 4,584,328 | 4/1986 | Madono | 523/145 |

*Primary Examiner*—Lewis T. Jacobs
*Attorney, Agent, or Firm*—David L. Hedden

[57] ABSTRACT

This invention relates to heat curable foundry mixes and binder compositions particularly suitable for making foundry shapes by a hot box process. The binders used are aqueous basic solutions of phenolic resole resins. Salts are added to the binders or the sand to improve the tensile strength of foundry shapes made with the foundry mixes. Silicone compounds are added to the aggregate to improve the water resistance of foundry shapes made with the foundry mixes containing the binder and salt. The foundry shapes are used to prepare metal castings.

33 Claims, No Drawings

HEAT CURABLE FOUNDRY MIXES AND BINDER COMPOSITIONS

TECHNICAL FIELD

This invention relates to heat curable foundry mixes and binder compositions particularly suitable for making foundry shapes by a hot box process. The binders used are aqueous basic solutions of phenolic resole resins. Salts are added to the binders or the aggregate to improve the tensile strength of foundry shapes made with the foundry mixes. Silicone compounds are added to the aggregate to improve the water resistance of foundry shapes made with the foundry mixes containing the binder and salt. The foundry shapes are used to prepare metal castings.

BACKGROUND

It is known that heat curable workable foundry shapes can be prepared by the so-called "hot box" process. This process involves injecting a mixture of a foundry aggregate containing an acid-generating curing catalyst and a thermosetting resin into a heated corebox where it is allowed to harden into a workable foundry shape, which is then removed from the corebox. Curing according to this process takes place in an acidic medium. The use of this process can, depending upon the choice of catalyst and resin, cause the formation of undesirable smoke and fumes due to the generation of free phenol and free formaldehyde, as well as the generation of significant amounts of nitrogen which can result in the formation of casting defects (pinholes) when metal castings are prepared. This process also requires that the acid-generating curing catalyst and thermosetting resin be mixed with the aggregate as separate components.

SUMMARY OF THE INVENTION

The subject invention relates to heat curable foundry mixes comprising:
  a. a foundry aggregate;
  b. an effective binding amount of a binder comprising an aqueous basic solution of a phenolic resole resin wherein said aqueous basic solution has
    (i) a viscosity of less than about 850 centipoise at 25° C.;
    (ii) a solids content of about 35 to about 75 percent by weight, said weight based upon the total weight of the basic solution; and
    (iii) an equivalent ratio of base to phenolic compound of about 0.2:1.0 to 1.1:1.0; and
  c. a salt in amount which will increase the tensile strength of the foundry shapes prepared with said binder.

The salt can be added directly to the binder in some cases as will be explained later. Usually it is added as an aqueous solution to the aggregate. The addition of the salt improves the tensile strength of foundry shapes made with the foundry mixes.

For applications where water resistance is important, a silicone fluid or emulsion is added to the aggregate before applying the binder and salt to it. It has been found that this causes the foundry shapes to be more water resistant.

With the proper selection of the salt, it is possible to improve tensile strengths of the workable foundry shapes without introducing compounds which will form nitrogen, undesirable smoke, and fumes. Many of the salts are inexpensive and do not add significant costs to the manufacturing process.

The foundry mixes are shaped and then cured by heating in a convection oven, microwave oven, or other heat source. Nevertheless, curing is generally carried out by a hot box process. However, in contrast to the traditional hot box process, where curing takes place in an acidic medium, the binders used herein are cured under basic conditions since the binder solution is highly basic (a pH of 9–13, usually a pH of 11–13) and the addition of the salt does not significantly affect the pH.

Other aspects of the invention relate to the process of preparing foundry shapes with the foundry mixes; the foundry shapes prepared with the mixes; the process of casting metal parts using the foundry shapes; and the metal casting prepared with the foundry shapes. The foundry mixes are particularly useful for making foundry shapes by a hot box process.

BEST MODE AND OTHER MODES FOR CARRYING OUT THE INVENTION

For purposes of describing and claiming this invention, the term "binder" will refer to the aqueous basic solution of phenolic resole resin. The binder is highly basic and generally has a pH of from 9 to 13, usually from 11 to 13. The term "binder composition will refer to a mixture of the binder, an inorganic salt", and other optional additives such as silanes, siloxanes, bench life extenders, release agents, etc. The term "foundry shape" includes foundry molds and cores made from foundry mixes.

The aggregate used to prepare the foundry mixes is that typically used in the foundry nndustry for such purposes or any aggregate that will work for such purposes. Generally, the aggregate will be sand which contains at least 70 percent by weight silica. Other suitable aggregate materials include zircon, olivine, alumina-silicate sand, chromite sand, and the like. Generally, the particle size of the aggregate is such that at least 80 percent by weight of the aggregate has an average particle size between 50 and 150 mesh (Tyler Screen Mesh).

As was mentioned, the binder is an aqueous basic solution of phenolic resole resin. The resin used in the solution is prepared by methods well known in the foundry art. The general procedure involves reacting an excess of aldehyde with a phenolic compound in the presence of a base at temperatures of about 50° C. to 120° C., typically from 70° C. to 100° C., to prepare a phenolic resole resin. Generally the reaction will also be carried out in the presence of water. The resulting phenolic resole resin is diluted with a base and/or water so that an aqueous basic solution of the phenolic resole resin results having the following characteristics:

1. a viscosity of less than about 850 centipoise, preferably less than about 450 centipoise at 25° C. as measured with a Brookfield viscometer, spindle number 3 at number 12 setting;

2. a solids content of 35 percent by weight to 75 percent by weight, preferably 50 percent by weight to 60 percent by weight, based upon the total weight of the aqueous basic solution, as measured by a weight loss method by diluting 0.5 gram of aqueous resole solution with one mi liliter of toluene and then heating on a hotplate at 150° C. for 15 minutes; and 3. an equivalent ratio of base to phenol of from 0.2:1 to 1.1:1.0, preferably from 0.3:1.0 to 0.95:1.0.

As an alternative to the procedure outlined, it may be possible to prepare the aqueous basic solutions by dissolving all of the base in phenol and then reacting with formaldehyde until the desired properties are achieved.

It has been found that aqueous basic solutions having viscosities outside the cited range are difficult to use in hot box equipment. Aqueous basic solutions with a solids content below the cited range will not sufficiently coat the aggregate while those having a solids content above the cited range will not be sufficiently flowable in the molding equipment. The equivalent ratio specified for the base relates to the need for having solutions which have adequate shelf stability.

Although these ranges have been specified, it should be pointed out that it is not claimed that these aqueous basic solutions are novel products, or that the ranges are critical. The ranges are set forth to provide guidelines for those who want to make and use the invention. Obviously, the invention will usually be practiced more effectively in the preferred ranges specified. With this in mind, more specific procedures will be set forth for preparing phenolic resole resins.

The phenolic compounds used to prepare the phenolic resole resins can be represented by either of the following structural formulae:

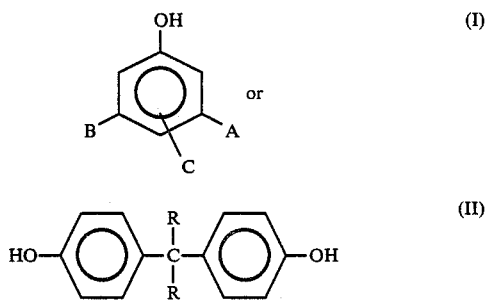

wherein A, B, and C are individually selected from the group consisting of hydrogen, hydrocarbon radicals, hydroxy, and halogen in formula I, and R in formula II is hydrogen or a methyl radical.

The aldehyde used in preparing the phenolic resole resin may also vary widely. Suitable aldehydes include aldehydes such as formaldehyde, acetaldehyde, propionaldehyde, furfuraldehyde, and benzaldehyde. In general, the aldehydes used have the formula RCHO, where R is a hydrogen or a hydrocarbon radical of 1 to 8 carbon atoms. The most preferred aldehyde is formaldehyde.

The basic catalysts used in preparing the phenolic resole resin include basic catalysts such as alkali or alkaline earth hydroxides, and organic amines. The amount which is used depends upon the specific properties desired and the process utilized. Those skilled in the art are familiar with these amounts.

It is possible to add modifiers such as lignin and urea when preparing the phenol-formaldehyde resole resins as long as the amount is such that it will not detract from achieving the desired properties of the aqueous basic solutions. Often the urea is added as a scavenger to react with unreacted formaldehyde and remove the odor caused by it.

The phenolic resole resins used in the practice of this invention are generally made from phenol and formaldehyde at a mole ratio of formaldehyde to phenol in the range of from about 1.1:1.0 to about 3.0:1.0. The most preferred mole ratio of formaldehyde to phenol is a mole ratio in the range of from about 1.4:1.0 to about 2.2:1.0.

As was mentioned previously, the phenolic resole resin is either formed in the aqueous basic solution, or it is diluted with an aqueous basic solution. The base used in the aqueous basic solution is usually an alkali or alkaline earth metal hydroxide such as potassium hydroxide, sodium hydroxide, calcium hydroxide, or barium hydroxide, preferably potassium hydroxide. It should again be mentioned that the aqueous basic solutions of phenolic resole resins described herein are not novel products, nor is their preparation. The parameters set forth pertaining to their preparation are merely guidelines for those who want to make the aqueous basic solutions of phenolic resole resins. There may be other ways to make them not described herein.

The binder is used in an effective binding amount. An effective binding amount is amount which will impart adequate tensile strengths to the foundry shapes, when used in conjunction with the inorganic salt, for the particular uses of the foundry shapes. Generally, an effective binding amount of the binder is from 0.5 weight percent to 7.0 weight percent, based upon the weight of the aggregate, usually from 1.0 weight percent to 3.0 weight percent of binder.

The salts used in the foundry mix to improve the tensile strength of the foundry shapes made with the foundry mix are inorganic or organic salts. They are usually added to the aggregate as aqueous solutions. However, salts which are compatible with the binder can be added directly to the binder. Salts which are compatible with the binder are those which will not react with the binder to form insoluble products. Such salts also provide binder compositions which are predominately homogeneous. These salts have the advantage of enabling the formulator to package, sell, and disperse the mixture of binder and salt in one container.

In general the potassium and sodium salts of inorganic acids, particularly mineral acids such as hydrochloric acid, sulfuric acid, and nitric acid, are more compatible with the binder. On the other hand, multivalent metal salts such as $ZnSO_4$, $CuSO_4$, $NiSO_4$, $Mn(NO_3)_2$, $SnCl_4$, $Al(NO_3)_3$, and the like are not compatible with the binder.

Although the salts can be added directly to the binder or aggregate depending upon their compatibility with the binder, another way of getting the salt into the binder is by forming it in situ. This is done by adding a solution of an acid, which is capable of forming a salt, to the binder or aggregate. Generally used as the acid is an inorganic acid such as a mineral acid, for example sulfuric acid, nitric acid, and hydrochloric acid.

The amount of salt or salt forming acid used is an amount sufficient to increase the tensile strength of the foundry shapes made with the foundry mix containing the binder and salt. Generally, this amount is from 1 to 10 weight percent based upon the weight of the binder, typically from 3 to 7 weight percent. When a dilute solution of the salt or acid is used (such a 10 to 50 percent solution in water, typically a 20 to 30 percent solution in water), from 10 percent to 50 percent by weight of the solution, is used based upon the weight percent of the binder, typically from 20 to 50 percent by weight. Obviously these weight percentages are not absolute guidelines. The amount chosen by one skilled in the art will depend upon the pH of the resin, the solids content of the resin, the dilution and equivalency of the salt added, and concentration of the acid if one is used.

Although not required to improve the tensile strengths of foundry shapes made with the binder and salt, it is preferable to use a silicone compound where the foundry shape must show a higher degree of resistance to water. In such cases the water may come from moisture in the air or special processing conditions of the foundry shapes, such as immersion in a core wash. The addition of a silicone compound to the foundry mix containing the binder and salt improves the resistance of the foundry shape to moisture.

Silicone compounds, which can be used in the foundry mix to improve the water resistance of the foundry shapes made with the foundry mix, typically are polydimethylsiloxanes, often trimethylsilyl terminated. Generally, they are sold commercially as fluids or emulsions (which contain water and a surfactant as well as the silicone compound). Examples of commercially available products which contain silicone compounds and are effective include DC 1101, DC 108, DC 24, DC 531. All of these mentioned products are emulsions except DC 531, and all are sold by Dow Corning Corporation. Examples of other commercially available silicone compounds are LE-460, AF-70 which are sold by Union Carbide and General Electric respectively.

The silicone compound is preferably mixed with the foundry aggregate before the binder and salt are added to the aggregate. The amount of silicone compound used in the foundry mix is an amount effective to make foundry shapes prepared with the mix more resistant to water. Generally this will be from 0.01 to 1.0 weight percent based upon the weight of the sand, more typically from 0.05 to 0.1 weight percent. Since silicone compounds are expensive, one would not generally use more than was essential for the particular application.

It will be apparent to those skilled in the art that other additives such as silanes, benchlife extenders, release agents, solvents, etc. can be used and may be added to the binder composition, aggregate, or foundry mix.

Curing can be accomplished by heating the shaped foundry mix in a convection oven, a microwave oven, or by means of another heat source. Generally, however, curing is accomplished by injecting the foundry mix into a core box which has been heated to a temperature sufficient to cure the foundry mix and produce a workable foundry shape. Generally, the temperature needed to cure the foundry mix is from 200° C. to 300° C., preferably from 230° C. to 260° C. A workable foundry shape is one which can be handled without breaking. Generally, the foundry mix must reside in the core box from 15 seconds to 120 seconds, usually from 30 seconds to 90 seconds to produce a workable foundry shape.

Metal castings can be prepared from the workable foundry shapes by methods well known in the art. Molten ferrous or non-ferrous metals are poured into or around the workable shape. The metal is allowed to cool and solidify, and then the casting is removed from the foundry shape.

EXAMPLES

The examples which follow will illustrate specific embodiments of the invention. They are not intended to imply that the invention is limited to these embodiments. The temperatures in the examples are in degrees Centigrade and the parts are parts by weight unless otherwise specified.

In the examples, the following binder was used to prepare the foundry mixes:

A 1:1.7 phenol-formaldehyde base catalyzed resole condensate having a pH of approximately 9.0 is prepared by warming a stired mixture of 30.0 parts of phenol, 32.6 parts of 50% formaldehyde solution, 8.2 parts of water and 2.3 parts of methanol to 83° C. To this mixture is added 0.9 parts of 50% sodium hydroxide solution and the temperature is allowed to exotherm, but not exceed 83° C. After the exotherm has subsided, 0.9 parts of 50% sodium hydroxide solution is added and the temperature is held at 83° C. for 2 hours. The mixture is then cooled to 70° C. and 3.5 parts of 50% potassium hydroxide solution is added over 15 minutes while allowing the temperature to rise to 83° C., applying heat when necessary. The reaction is continued at 83° C. until a refractive index of 1.4848 is reached, then is cooled to 60° C. and 21.2 parts of a 50% potassium hydroxide solution is added and agitation is continued for 10 minutes at 60° C. before cooling to room temperature. The resulting resole solution has a percent solids content of 50–53% and a viscosity of 110–180 c.p.s. @25° C. The resole solution has an equivalent ratio of base to phenol of about 0.76:1.

Foundry mixes were prepared as indicated in the examples. In all of the examples Manley 1L5W sand was used. The amount of binder used was two weight percent based upon the weight of the sand (BOS).

The resulting foundry mixes were forced by air blowing the mix into a standard AFS core box (dog bone shape) which had been heated to a temperature of 232° C. The tensile strengths (in psi) for various samples were measured after being taken from the core box at specified dwell times (dwell times were 60 and 90 seconds in most cases). The hot tensile measurements were taken within 10 seconds after removing the shapes from the corebox. The cold tensiles were measured at least 1 hour after removing the shapes from the corebox and storing them at a relative humidity of approximately 50 percent. Tensile measurements were also made 24 hours after being taken from the corebox, and 24 hours after being taken from the corebox and being exposed to relative humidity of 100 percent for 1 hour (24+1).

EXAMPLES 1–7

Examples 1–7 illustrate the effect of using a salt in the foundry mix on the tensile strengths of foundry cores prepared with the foundry mix. The tensile strength is first shown for a foundry mix without a salt (Control #1). In Examples 2–5 a 20 percent aqueous solution of the salt was mixed with the aggregate, while Examples 1 and 6 used a 30 percent aqueous solution. The solution was used in an amount of 20 percent by weight based upon the weight of the binder. Control #2 was needed because the experiments with the hydroxylamine sulfate were carried out on a different day.

In comparison Example A, Example 6 is repeated except 0.066 percent by weight (based upon the weight of the aggregate) of a silicone compound, DC 1101, is added to the aggregate before mixing in the binder composition. In comparison Example B, comparison Example A is repeated except no salt is used. The results are shown in Table I.

The results of Example 1–6 show that the use of a salt in the foundry mix increases the tensile strength of cores made with the foundry mix, particularly the cold tensile strengths and the tensile strengths measured 24 hours after being removed from the core box. These experiments suggest that the addition of the silicone compound does not improve tensile strengths in the presence or absence of the salt.

Examples 11–14 show that the DC1101 silicone emulsion makes cores, containing the salt, more water resistant. TABLE III which follows summarizes the results

TABLE I (Results of Core Making Tests Using Foundry Mixes with a Salt)

| | | \multicolumn{8}{c}{Tensiles} | | | | | | | |
|---|---|---|---|---|---|---|---|---|---|
| | | Hot Dwell (sec) | | Cold Dwell (sec) | | 24 hr. Dwell (sec) | | 24 + 1 100% Dwell (sec) | |
| Example | Salt Used | 60 | 90 | 60 | 90 | 60 | 90 | 60 | 90 |
| Control #1 | None | 89 | 125 | 141 | 165 | 60 | 60 | 36 | 43 |
| 1 | NH$_2$OH.HCl | 95 | 108 | 155 | 273 | 118 | 117 | 58 | 62 |
| 2 | NaCl | 78 | 134 | 177 | 257 | 78 | 114 | 42 | 53 |
| 3 | CH$_3$COONa | 71 | 109 | 151 | 231 | 63 | 83 | 54 | 63 |
| 4 | CuSO$_4$ | 77 | 126 | 144 | 168 | 71 | 86 | 33 | 44 |
| 5 | ZnSO$_4$ | 73 | 100 | 170 | 223 | 86 | 120 | 41 | 63 |
| Control #2 | none | 75 | 118 | 99 | 194 | 77 | 91 | 50 | 73 |
| 6 | NH$_2$OH.H$_2$SO$_4$ | 73 | 118 | 138 | 281 | 123 | 157 | 62 | 101 |
| Comparison A | NH$_2$OH.H$_2$SO$_4$/DC 1101 | 69 | 107 | 131 | 213 | 122 | 149 | 60 | 88 |
| Comparison B | no salt/only DC 1101 | 62 | 103 | 123 | 114 | 63 | 79 | 38 | 102 |

EXAMPLES 7–10

Examples 7–10 illustrate the effect on the water resistance of the cores of adding a silicone compound to a foundry mix containing a salt. The tensile strength is first shown for a foundry mix containing no salt and no silicone (Control #3). In all of the examples the silicone compound was DC 1101 sold by Dow Corning. It was added directly to the aggregate before adding the binder and salt. The amount of silicone used in Examples 7–10 was 0.066 weight percent based upon the weight of the aggregate. In these examples, a salt solution was added to the aggregate in an amount of 20 weight percent based upon the weight of the binder.

The following test was used to determine the water resistance of the cores:

Core Wash Test

In order to improve the core's performance when making metal castings, it is common practice to dip the cores in a core wash solution. The corewash used for testing the cores in these tests is a mixture of water, graphite, and ceramic materials having a specific gravity of 32° Be (Baume).

The cores are prepared by allowing them to dwell in the corebox for 80 seconds at a temperature of 232° C. After cooling for one half hour, the tensile strength of the standard (STD) is measured. Another sample is dipped in and out of the core wash, baked at 450° F. for 30 minutes, stored at room temperature for 60 minutes, and then the tensile strength is measured.

The results of the core wash test are shown in TABLE II. The tensile strengths of the cores are shown before and after dipping them in the core wash. If the cores do not crumble and disintegrate after being dipped, they show satisfactory water resistance.

TABLE II (Results of Core Making Tests Using Foundry Mix with Salt and Silicone)

| Example | Salt Used | Concentration of Salt Solution (wt. %) | Tensile (psi) Before Dip | Tensile (psi) After Dip |
|---|---|---|---|---|
| Control #3 | none | none | 230 | crumbled |
| 7 | NH$_2$OH.H$_2$SO$_4$ | 30 | 329 | 104 |
| 8 | NH$_4$NO$_3$ | 54 | 317 | 123 |
| 9 | (NH$_4$)$_2$SO$_4$ | 30 | 154 | 121 |
| 10 | NH$_4$Cl | 20 | 270 | 74 | of experiments carried out under conditions similar to those used in Examples 7–10 except different silicone compounds were used. These examples indicate that the silicones used in these examples were effective at improving the water resistance of the cores which contained the salt and silicone. The salt used in all of theses examples was hydroxylamine sulfate. Control #4 did not contain a salt or a silicone compound.

TABLE III (Results of Core Making Tests Using Foundry Mix with Salt and Silicone)

| Example | Silicone Used* | Tensile (psi) Before Dip | Tensile (psi) After Dip |
|---|---|---|---|
| Control #4 | None | 273 | crumbled |
| 11 | DC1101 | 323 | 90 |
| 12 | DB110A | 266 | 29 |
| 13 | LE460HS | 355 | 121 |
| 14 | SM2155 | 312 | 127 |

DB110A — a silicone compound sold by Dow Corning.
LE460HS — a silicone compound sold by Union Carbide.
SM2155 — a silicone compound sold by General Electric.

Examples 15–17

These examples were carried out under similar conditions to Examples 7–14 except that in Example 15 a 20 percent salt solution of Na$_2$SO$_4$ was added directly to the binder instead of the aggregate, and in Examples 16 and 17 HCl (10% aqueous solution) and H$_2$SO$_4$ (20% aqueous solution) were respectively added to the aggregate to form the salt in situ. The results of these experiments are summarized in TABLE IV.

TABLE IV

| Example | Tensile (psi) Before Dip | Tensile (psi) After Dip |
|---|---|---|
| 15 | 271 | 45 |

TABLE IV-continued

| Example | Tensile (psi) Before Dip | Tensile (psi) After Dip |
| --- | --- | --- |
| 16 | 168 | 79 |
| 17 | 167 | 77 |

Examples 15-17 illustrate that the salt can be added directly to the binder or it can be formed in situ by adding an acid to the aggregate.

We claim:

1. A heat curable foundry mix comprising;
   a. a foundry aggregate;
   b. an effective binding amount of a binder comprising an aqueous basic solution of a phenolic resole resin wherein said aqueous basic solution has
      i. a viscosity of less than about 850 centipoise at 25° C.;
      ii. a solids content of about 35 to about 75 percent by weight, said weight based upon the total weight of the basic solution; and
      iii. an equivalent ratio of base to phenolic compound of about 0.2:1.0 to 1.1:1.0; and
   c. an inorganic salt in an amount effective to increase the tensile strength of the foundry shapes prepared with said foundry mix.

2. The foundry mix claim 1 wherein the equivalent ratio of base to phenolic compound used in preparing the binder is from 0.3:1.0 to 0.95:1.0 and the phenolic compound used to prepare the binder is represented by the following structural formula:

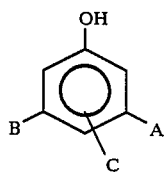

wherein A, B, and C are individually selected from the group consisting of hydrogen, hydrocarbon radicals, and halogen.

3. The foundry mix of 2 wherein the base catalyst used to prepare the phenolic resin of the binder is selected from the group consisting of sodium hydroxide, potassium hydroxide, and mixtures thereof.

4. The foundry mix of claim 3 where the viscosity of the binder is from less than about 450 centipoise at 25° C.

5. The foundry mix of claim 4 wherein the phenolic resole resin of the binder is prepared by reacting formaldehyde and phenol in a mole ratio of formaldehyde to phenol of about 1.1:1.0 to about 2.2:1.0 in the presence of an effective amount of a basic catalyst at elevated temperatures of about 50° C. to about 120° C.

6. The foundry mix of claim 5 wherein the salt is used as an aqueous solution.

7. The foundry mix of claim 6 wherein the salt is a sodium, potassium, ammonium, or hydroxylamine salt of an inorganic acid.

8. The foundry mix of claim 7 wherein the inorganic acid is sulfuric acid or hydrochloric acid.

9. The foundry mix of claim 8 wherein a salt solution which is compatible with the binder is premixed with the binder before mixing with the aggregate.

10. The foundry mix of claim 8 wherein the salt solution is formed in situ by the addition of the acid to the binder or the aggregate.

11. The foundry mix of claim 8 wherein a salt solution is mixed with the foundry aggregate before the binder is mixed with the aggregate.

12. The foundry mix of claim 9 wherein the salt solution is used in an amount such that amount of salt added to the binder is from 1 to 10 weight percent based upon the weight of the binder.

13. The foundry mix of claim 10 wherein the salt solution is used in an amount such that salt is present in amount of from 1 to 10 percent based upon the weight of the binder.

14. The foundry mix of claim 11 wherein the salt solution is used in an amount such that salt is present in amount of from 1 to 10 percent based upon the weight of the binder.

15. The foundry mix of claim 9 wherein the salt solution is used in an amount such that salt is present in amount of from 3 to 7 percent based upon the weight of the binder.

16. The foundry mix of claim 11 wherein the salt solution is used in an amount such that salt is present in amount of from 3 to 7 percent based upon the weight of the binder.

17. The foundry mix of claim 6 wherein the salt solution is an aqueous solution of a mulitvalent metal salt.

18. The fondry mix of claim 11 wherein a silicone compound is mixed with the foundry aggregate, prior to mixing the binder with the foundry aggregate, in an amount effective to increase the water resistance of the foundry shapes prepared with the foundry mix.

19. The foundry mix of claim 18 wherein the silicone compound is applied as a fluid or emulsion.

20. The foundry mix of claim 19 wherein the silicone compound is a polydimethyl siloxane.

21. The foundry mix of claim 20 wherein the polydimethyl siloxane is used in an amount of 0.01 to 0.5 weight percent, based upon the weight percent of the aggregate.

22. A foundry binder composition comprising:
   a. a binder comprising an aqueous basic solution of a phenolic resole resin wherein said aqueous basic solution has
      1. a viscosity of less than about 850 centipoise at 25° C.;
      2. a solids content of about 35 to about 75 percent by weight, said weight based upon the total weight of the basic solution; and
      3. an equivalent ratio of base to phenol of about 0.2:1.0 to 1.1:1.0; and
   b. an inorganic salt, which is compatible with the binder, in amount effective to increase the tensile strength of the foundry shapes prepared with foundry mixes made with said binder.

23. The binder composition of claim 22 wherein the equivalent ratio of base to phenol used in preparing the binder is from 0.3:1.0 to 0.95:1.0.

24. The binder composition of claim 23 wherein the base catalyst used to prepare the phenolic resin of the binder is selected from the group consisting of sodium hydroxide, potassium hydroxide, and mixtures thereof.

25. The binder composition of claim 24 where the viscosity of the binder is from less than about 450 centipoise at 25° C.

26. The binder composition of claim 25 wherein the phenolic resole resin of the binder is prepared by reacting formaldehyde and phenol in a mole ratio of formaldehyde to phenol of about 1.1:1.0 to about 2.2:1.0 in the presence of an effective amount of a basic catalyst at elevated temperatures of about 50° C. to about 120° C.

27. The binder composition of claim 26 wherein the salt is an aqueous solution of a sodium or potassium salt of a mineral acid.

28. The binder composition of claim 27 wherein the mineral acid is sulfuric acid or hydrochloric acid.

29. The binder composition of claim 28 wherein the salt is formed in situ by the addition of a mineral acid to the binder.

30. The binder composition of claim 28 wherein the salt solution is used in an amount such that amount of salt added to the binder is from 1 to 10 weight percent based uponthe weight of the binder.

31. The binder composition of claim 29 wherein the salt solution is used in an amount such that salt is present in amount of from 1 to 10 percent based upon the weight of the binder.

32. The binder composition of claim 28 wherein the salt solution is used in an amount such that salt is present in amount of from 1 to 10 percent based upon the weight of the binder.

33. The binder composition of claim 29 wherein the salt solution is used in an amount such that salt is present in amount of from 3 to 7 percent based upon the weight of the binder.

* * * * *